Jan. 14, 1947.                L. I. PICKERT                2,414,392
                                 AIR BRAKE
                            Filed Nov. 8, 1945
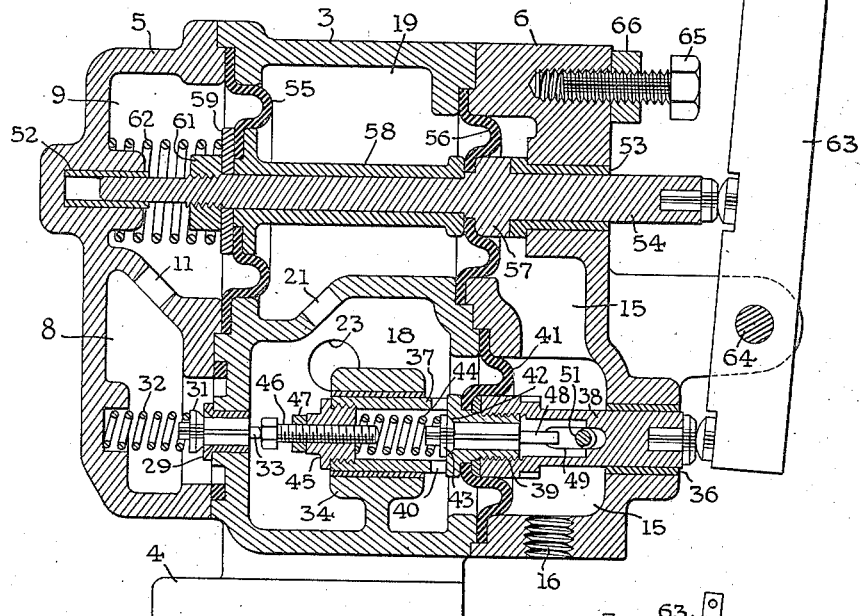
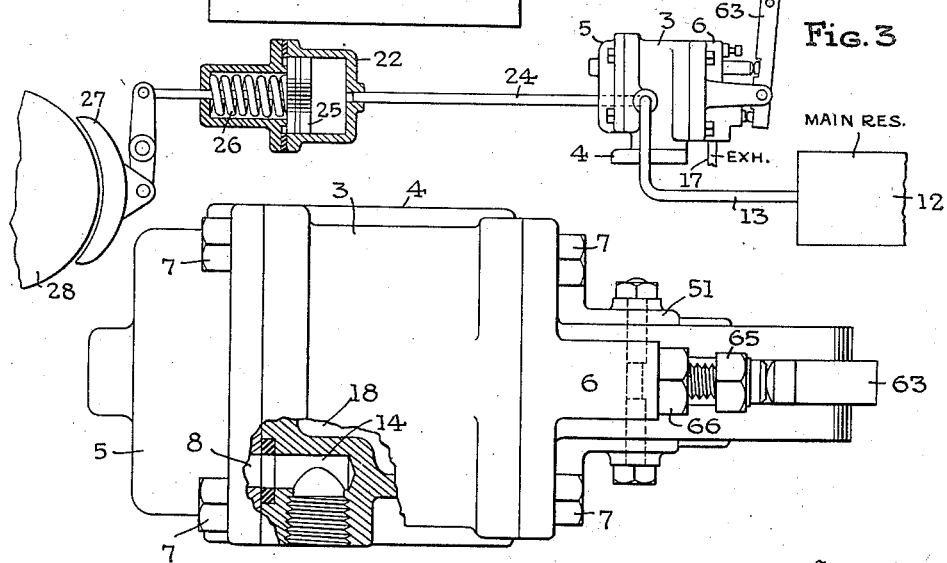
Inventor
Lynn I. Pickert
By Dodge and Ims
Attorneys Patented Jan. 14, 1947

2,414,392

UNITED STATES PATENT OFFICE 2,414,392

AIR BRAKE

Lynn I. Pickert, Watertown, N. Y., assignor to The New York Air Brake Company, a corporation of New Jersey Application November 8, 1945, Serial No. 627,461

7 Claims. (Cl. 303—50)

This invention relates to control valves for fluid pressure actuated hoist brakes.

It is considered desirable in hoist brakes to bias the brake to full applied position by a weight or spring, and control the application by varying the pressure in a brake cylinder which opposes the weight or spring. In this way safety is assured because failure of any part of the fluid pressure system causes a brake application.

The object of the invention is to provide a control valve whose manual actuator is subjected to a force reaction in a brake releasing direction approximately proportional to the intensity of the application, thus giving a "feel" to the actuator. The difficulty in attaining this result arises from the fact that brake cylinder pressure falls as the intensity of application rises. The invention provides means for developing upon the manual actuator a force reaction which is proportional to the differential between the uniform pressure of supply and brake cylinder pressure. Since the differential increases as brake cylinder pressure falls the reaction force increases with the intensity of brake application.

Because of the flexibility of control a pneumatic system is preferred, and the invention will be described as so embodied.

In the drawing:

Fig. 1 is a vertical axial section of the control valve in full release position.

Fig. 2 is a plan view with a part broken away to show the supply connection.

Fig. 3 is a diagram of a typical system including the improved valve.

In the description statements of direction are relative and refer to the valve viewed as in Fig. 1.

The housing comprises a body 3 with mounting base 4, a pressure cap 5, and an exhaust cap 6 connected by bolts 7, as shown.

The pressure cap 5 is hollow and encloses an inlet valve chamber 8 and a reaction chamber 9 in free communication with each other through port 11. Both are supplied with air under pressure from main reservoir 12 through pipe 13 (see Fig. 3) by way of port 14 (Fig. 2).

The exhaust cap 6 is hollow and encloses a chamber 15 vented to atmosphere through port 16. An exhaust pipe 17 may be attached as shown in Fig. 3.

The body 3 is divided into a valve chamber 18 and reaction chamber 19 in free communication with each other through port 21. Both chambers are in free communication with brake cylinder 22 by way of port 23 (Fig. 1) and brake cylinder pipe 24 (Fig. 3).

As shown in Fig. 3 the brake cylinder 22 contains a piston 25 urged by spring 26 in a direction to apply the brake 27 to brake drum 28. These parts are diagrammed without strict regard to scale, and the spring typifies any means constantly urging the brake in an applying direction. Weights are also commonly used for this purpose.

Mounted in the wall between inlet valve chamber 8 and valve chamber 18 is the seat bushing 29 for the poppet type inlet valve 31. This valve is urged closed by coil compression spring 32 and has a thrust lug 33 at the end of its pilot. In the valve chamber 18 is a bushed guide 34 and through the cap 6 extends a guide bushing 36 for a valve unit made up of a cage 37 ported at 40 and a hollow stem 38, the latter extending out through guide bushing 36. The cage 37 and stem 38 are threaded together at 39 and clamp between them the central portion of a diaphragm 41 whose margin is clamped between portions of housing 3 and cap 6.

The cage 37 includes a seat 42 for the poppet type exhaust valve 43 which is biased closed by coil compression spring 44. This reacts against the plug 45 screwed into the left hand end of the cage 37. Threaded into plug 45 is thrust stem 46 which is adjustable to fix its point of engagement with lug 33 on the inlet valve. The adjustment, when made, is fixed by lock nut 47.

The exhaust valve 43 has a lug 48 on the end of its pilot and this extends into the hollow portion of stem 38 adjacent a cross slot 49. A cross pin 51 fixed at its ends in cap 6 extends through the slot in the path of the lug.

The parts are so arranged and adjusted that stem 38 has a neutral or lap position in which inlet valve 31 and exhaust valve 43 are both allowed to close. If the stem 38 be moved to the left, or to the right, from this position the inlet or the exhaust valve as the case may be will be unseated selectively producing respectively release and application of the brake 27.

Guided in bushing 52 in cap 5, and extending out through guide bushing 53 in cap 6, is reaction stem 54. This stem extends through reaction chambers 9 and 19 and exhaust chamber 15. Chambers 9 and 19 are separated by relatively large slack diaphragm 55 clamped at its margin between body 3 and cap 5 and chambers 19 and 15 are separated by a smaller diaphragm 56 clamped at its margin between body 3 and cap 6. Diaphragm 56 is equal in area with diaphragm 41.

Both diaphragms 55 and 56 are clamped at their centers to reaction stem 54 by means of shoulder 57, flanged spacer sleeve 58, washer 59 and nut 61 threaded on stem 54 as clearly shown in Fig. 1. A biasing spring 62 urges the stem 54 to the right, and as will later appear, is for the purpose of urging the manual actuator toward brake-releasing position.

The manual actuator is shown as a lever of the first class 63, fulcrumed at 64 on cap 6, and in thrust engagement with the right hand ends of valve actuating stem 38 and reaction stem 54. To apply the brake the lever 63 is turned counter-clockwise. Suitable linkage can be attached to lever 63 to adapt the control valve for manual or pedal applied force.

The diaphragms 41 and 56 function as packless glands, and since they are equal in area, are subject at all times to the same pressure differential, and are arranged to react oppositely on lever 63, their force reactions neutralize each other. Diaphragm 55 is subject on its left side to supply pressure in reaction chamber 9, and on its right side to brake cylinder pressure in reaction chamber 19.

In the release position of the brakes these pressures are equal and their respective forces on diaphragm 55 neutralize each other. Biasing spring 62 is selected to have a greater compression ratio than coil compression spring 32 and therefore develops an unbalanced force on stem 54 which urges the manual actuator 63 toward release position and affords the initial "feel" on the actuator.

As brake cylinder pressure is reduced to apply the brakes, diaphragm 55 is subjected to an increasing pressure differential and develops an increasing force urging lever 63 toward release position, thus affording the desired "feel" notwithstanding the inverse relation between brake cylinder pressure and intensity of brake application.

The screw 65 and check nut 66 serve as an adjustable stop to limit motion of lever 63 in a brake-applying direction. It will be noted that at the point of maximum brake application, the brake cylinder pressure is that of atmosphere. Since diaphragm 55 is subject to a constant biasing force on its left side, the maximum value of the developed resisting force is the difference between this constant biasing force and the force exerted by atmospheric pressure on the right side of diaphragm 55.

The construction described affords an inexpensive and simple mechanism for applying the differential between supply pressure and brake cylinder pressure to the development of a significant "feel" reaction on the manual controller, but others within the scope of the invention will suggest themselves to persons skilled in the art.

What is claimed is:

1. In a control valve for a fluid pressure brake cylinder of the type in which the cylinder acts to neutralize a brake applying force and thus cause release of a normally applied brake, the combination of a valve device of the admission and exhaust type, having a fluid pressure supply connection, a brake cylinder connection and an exhaust, said valve device having a lap position in which the brake cylinder connection is disconnected from both supply and exhaust, from which lap position the valve is manually movable in relatively reverse directions to connect the brake cylinder connection selectively with the supply connection or with exhaust; and loading means responsive to the fluid pressure differential between the supply and brake cylinder connections and serving to urge said valve device in the direction to connect the supply and brake cylinder connections.

2. In a control valve for a fluid pressure brake cylinder of the type in which the cylinder acts to neutralize a brake applying force and thus cause release of a normally applied brake, the combination of a valve device of the admission and exhaust type, having a fluid pressure supply connection, a brake cylinder connection and an exhaust, said valve device having a lap position in which the brake cylinder connection is disconnected from both supply and exhaust, from which lap position the valve is manually movable in relatively reverse directions to connect the brake cylinder connection selectively with the supply connection or with exhaust; loading means responsive to the fluid pressure differential between the supply and brake cylinder connections and serving to urge said valve device in the direction to connect the supply and brake cylinder connections; and constantly acting yielding means urging said valve in the direction last named.

3. In a control valve for a fluid pressure brake cylinder of the type in which the cylinder acts to neutralize a brake applying force and thus cause release of a normally applied brake, the combination of a valve device of the admission and exhaust type, having a fluid pressure supply connection, a brake cylinder connection and an exhaust, said valve device having a lap position in which the brake cylinder connection is disconnected from both supply and exhaust, from which lap position the valve is manually movable in relatively reverse directions to connect the brake cylinder connection selectively with the supply connection or with exhaust; and loading means responsive to a decrease in brake cylinder pressure serving to urge said valve device in the direction to connect the supply and brake cylinder connections.

4. In a control valve for a fluid pressure brake cylinder of the type in which the cylinder acts to neutralize a brake applying force and thus cause release of a normally applied brake, the combination of a valve device of the admission and exhaust type, having a fluid pressure supply connection, a brake cylinder connection and an exhaust, said valve device having a lap position in which the brake cylinder connection is disconnected from both supply and exhaust, from which lap position the valve is manually movable in relatively reverse directions to connect the brake cylinder connection selectively with the supply connection or with exhaust; loading means responsive to a decrease in brake cylinder pressure serving to urge said valve device in the direction to connect the supply and brake cylinder connections; and constantly acting yielding means urging said valve in the direction last named.

5. The combination of a source of pressure fluid; a brake cylinder; a control valve of the admission and exhaust type shiftable to connect said brake cylinder selectively with said source and with exhaust; means biasing said valve toward its admission position; a manually operable actuator for shifting said valve against said bias; and fluid pressure operated loading means responsive to the differential between the pressure at said source and pressure in said brake cylinder, said loading means acting in the direction of said bias.

6. The combination of a source of pressure fluid; a brake cylinder; a control valve of the admission and exhaust type shiftable to connect said brake cylinder selectively with said source and with exhaust; means biasing said valve toward its admission position; a manually operable actuator for shifting said valve against said bias; and fluid pressure operated loading means responsive to the pressure in said brake cylinder, said loading means acting to neutralize said bias in an increasing degree as brake cylinder pressure rises.

7. The combination of a source of pressure fluid; a brake cylinder; a control valve of the admission and exhaust type shiftable to connect said brake cylinder selectively with said source and with exhaust; means biasing said valve toward its admission position; a manually operable actuator for shifting said valve against said bias; and fluid pressure operated loading means responsive to the pressure in said brake cylinder, said loading means acting to neutralize said bias in an increasing degree as brake cylinder pressure rises, and said bias acting to neutralize the force on the manually operable actuator in an increasing degree as brake cylinder pressure falls.

LYNN I. PICKERT.